United States Patent
Meganathan et al.

(10) Patent No.: US 11,172,111 B2
(45) Date of Patent: Nov. 9, 2021

(54) DEVICES AND METHODS FOR SECURITY CAMERA INSTALLATION PLANNING

(71) Applicant: Honeywell International Inc., Morris Plains, NJ (US)

(72) Inventors: Deepak Sundar Meganathan, Bangalore (IN); Jitendra Sitaram Chaurasia, Mumbai (IN); Yudhvir Singh Rana, Gurugram (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/525,430

(22) Filed: Jul. 29, 2019

(65) Prior Publication Data

US 2021/0037174 A1 Feb. 4, 2021

(51) Int. Cl.
*H04N 7/18* (2006.01)
*H04N 5/225* (2006.01)
*H04N 5/232* (2006.01)

(52) U.S. Cl.
CPC ......... *H04N 5/2259* (2013.01); *H04N 5/2252* (2013.01); *H04N 5/23216* (2013.01)

(58) Field of Classification Search
CPC .................................................. H04N 5/2259
USPC ...................................................... 348/143
See application file for complete search history.

(56) References Cited

U.S. PATENT DOCUMENTS

| | | | |
|---|---|---|---|
| 7,378,942 B2 | 5/2008 | Seeley et al. | |
| 8,768,307 B1 * | 7/2014 | Heins | H04L 51/16 455/412.1 |
| 8,878,846 B1 * | 11/2014 | Francis, Jr. | G06T 19/006 345/420 |
| 9,013,505 B1 * | 4/2015 | Thornton | G09G 5/36 345/419 |
| 10,261,529 B2 | 4/2019 | Silva et al. | |
| 2003/0023411 A1 | 1/2003 | Witmer et al. | |
| 2005/0002662 A1 | 1/2005 | Arpa et al. | |
| 2006/0283938 A1 * | 12/2006 | Kumar | G06Q 50/28 235/382 |
| 2008/0071559 A1 * | 3/2008 | Arrasvuori | G06T 19/006 705/26.1 |
| 2009/0076969 A1 | 3/2009 | Sparks | |
| 2010/0161658 A1 * | 6/2010 | Hamynen | H04M 1/72572 707/770 |
| 2012/0249741 A1 * | 10/2012 | Maciocci | G06T 15/503 348/46 |

(Continued)

FOREIGN PATENT DOCUMENTS

| | | |
|---|---|---|
| IT | BO20 130 066 A1 | 8/2014 |
| WO | 2014182545 A1 | 11/2014 |

OTHER PUBLICATIONS

"CCTV Design Software in use: IP Video System Design Tool," JVSG Software, 9 pages, 2019.

(Continued)

*Primary Examiner* — Leron Beck
(74) *Attorney, Agent, or Firm* — Seager, Tufte & Wickhem, LLP

(57) ABSTRACT

A mobile device comprising a housing, a user interface, a camera that provides a camera video stream for display, and a controller configured to display a virtual field of view of a virtual security camera placed at a virtual security camera placement location at a site.

20 Claims, 6 Drawing Sheets

(56) References Cited

U.S. PATENT DOCUMENTS

| | | | |
|---|---|---|---|
| 2013/0088577 A1* | 4/2013 | Hakkarainen | H04N 5/23293 348/46 |
| 2013/0141460 A1* | 6/2013 | Kane-Esrig | H04M 3/5116 345/633 |
| 2014/0039685 A1* | 2/2014 | Blount | G08B 25/10 700/276 |
| 2014/0068486 A1* | 3/2014 | Sellers | H04L 12/282 715/771 |
| 2014/0071164 A1* | 3/2014 | Saklatvala | G06F 3/04815 345/633 |
| 2014/0157206 A1* | 6/2014 | Ovsiannikov | G06F 3/011 715/849 |
| 2014/0248950 A1* | 9/2014 | Tosas Bautista | G06F 1/1694 463/31 |
| 2014/0266687 A1* | 9/2014 | Britton | H04Q 9/00 340/539.1 |
| 2015/0043887 A1* | 2/2015 | Gurudoss | G08B 25/14 386/230 |
| 2015/0278829 A1* | 10/2015 | Lu | H04L 67/20 705/7.29 |
| 2016/0078698 A1* | 3/2016 | Moses | G07C 9/27 340/5.23 |
| 2016/0205355 A1 | 7/2016 | Warzelhan et al. | |
| 2016/0307374 A1* | 10/2016 | Kurz | G06T 15/06 |
| 2017/0182407 A1* | 6/2017 | Steele | A63F 9/24 |
| 2018/0067593 A1* | 3/2018 | Tiwari | G06F 3/048 |
| 2018/0158265 A1* | 6/2018 | Lyman | G07C 9/20 |
| 2018/0252829 A1* | 9/2018 | Koppang | G01V 1/303 |
| 2019/0385373 A1* | 12/2019 | Mittleman | G06T 19/006 |

OTHER PUBLICATIONS

Honovich, "IPVM," Google Maps Camera Calculator Released, 29 pages, Apr. 27, 2015.

"IPVM," IPVM Camera Calculator User Manual/Guide, 45 pages, Mar. 9, 2018.

"Professional design of CCTV systems," CCTVCAD Software, 5 pages, 2004.

European Extended Search Report, Application No. 20188487.1, dated Nov. 25, 2020, 8 pages.

* cited by examiner

DEVICES AND METHODS FOR SECURITY CAMERA INSTALLATION PLANNING

TECHNICAL FIELD

The disclosure relates generally to security systems, and more particularly to security camera installation planning at a site.

BACKGROUND

Commercial security systems typically include various security hardware devices placed at strategic locations around a site. The security hardware devices can include, for example, security cameras or various types, access control hardware, alarms, lighting, motion sensors, door locks, etc. To help ensure proper coverage is obtained, a significant amount of planning typically must take place in order to identify not only what particular security hardware devices are necessary, but also where the security hardware devices are to be deployed across the site. This often requires multiple on-site surveys involving customers, system integrators, and consultants, and can consume a significant amount of time and resources. Even when completed, the resulting plan may need to be altered once installation begins. For example, at present, there is no systematic approach during the planning stage to determine a precise location and/or height of a security camera, and/or type of security camera to use, to ensure that the security camera will have the desired coverage characteristics in the field. What would be desirable is a system and method for more accurately specifying security system requirements during the planning stage.

SUMMARY

The disclosure relates generally to security systems, and more particularly to security camera installation planning at a site. In one particular example, a mobile device may be configured to aid in camera installation planning of a security system at a site. In some cases the mobile device may include a housing, a user interface that may include a display screen fixed relative to the housing, a camera that may be fixed relative to the housing such that as the housing is oriented by a user to point the camera at various areas of the site and the camera may provide a camera video stream for display on the display screen. The mobile device may also include a controller that may be carried by the housing and may be operatively coupled to the display screen and the camera. The controller may be configured to display at least part of a virtual field of view of a virtual security camera placed at a virtual security camera placement location at the site, and the virtual field of view of the virtual security camera may be geographically fixed relative to the virtual security camera placement location and the site, and at least part of the virtual field of view may be displayed along with the camera video stream when the camera video stream displays a geographic area of the site that corresponds to the at least part of the virtual field of view of the virtual security camera.

Alternatively or additionally to the foregoing, the controller may be configured to not display the virtual field of view of the virtual security camera when the camera video stream displays a geographic area of the site that does not corresponds to the virtual field of view of the virtual security camera.

Alternatively or additionally to any of the embodiments above, the controller may be configured to store the virtual security camera placement location of the virtual security camera at the site.

Alternatively or additionally to any of the embodiments above, the virtual field of view of the virtual security camera may be, when displayed, superimposed over the camera video stream.

Alternatively or additionally to any of the embodiments above, the camera video stream may be displayed on the display screen in real time.

Alternatively or additionally to any of the embodiments above, the controller may be further configured to receive from the user of the mobile device via the user interface an input that places the virtual security camera at the virtual security camera placement location while the camera video stream displays the virtual security camera placement location.

Alternatively or additionally to any of the embodiments above, the controller may be further configured to receive from the user of the mobile device via the user interface an input that changes the virtual field of view of the virtual security camera.

Alternatively or additionally to any of the embodiments above, the controller may be further configured to receive from the user of the mobile device via the user interface an input that selects the virtual security camera from a plurality of available virtual security cameras.

Alternatively or additionally to any of the embodiments above, the controller may be further configured to use a reference measurement to scale the virtual field of view relative to the camera video stream.

Alternatively or additionally to any of the embodiments above, the mobile device includes a smart phone, a tablet computer, a laptop computer or a virtual reality headset.

In another example, a method for establishing placement of a security camera for surveillance of a site may include capturing a camera video stream of at least part of the site using a camera of a mobile device, the camera of the mobile device may have a camera field of view. The method may also include displaying an icon on the camera video stream when the camera field of view encompasses a virtual security camera placement location of a virtual security camera and the icon may indicate the virtual security camera placement location of the virtual security camera at the site. The method may further include displaying a virtual field of view of the virtual security camera on the camera video stream when the camera field of view encompasses at least part of the virtual field of view and the virtual field of view may be geographically fixed relative to the virtual security camera placement location and the site.

Alternatively or additionally to any of the embodiments above, the method may further include moving the camera such that the camera field of view does not include the virtual security camera placement location and does not include any part of the virtual field of view of the virtual security camera, and in response, displaying the camera video stream but not displaying the icon or the virtual field of view of the virtual security camera.

Alternatively or additionally to any of the embodiments above, the method may further include receiving an input that places the icon at the virtual security camera placement location while the camera field of view encompasses the virtual security camera placement location.

Alternatively or additionally to any of the embodiments above, the method may further include receiving an input that changes the virtual field of view of the virtual security camera.

Alternatively or additionally to any of the embodiments above, the method may further include receiving an input that selects the virtual security camera from a plurality of available virtual security cameras.

Alternatively or additionally to any of the embodiments above, the method further include using a reference measurement to scale the virtual field of view relative to the camera video stream.

Alternatively or additionally to any of the embodiments above, the mobile device may include a smart phone, a tablet computer, a laptop computer or a virtual reality headset.

In another example, a method for planning placement of one or more security cameras for surveilling a site may include moving about the site with a mobile virtual reality device that includes a camera that provides a real time video stream of a current field of view of the mobile virtual reality device and the current field of view may be referenced to a virtual environment of the site. The method may further include placing a virtual security camera in the current field of view of the mobile virtual reality device at a virtual security camera placement location at the site and the virtual security camera placement location may become geographically fixed relative in the site in the virtual environment. The method may also include providing a virtual field of view of the virtual security camera covering a geographic region of the site and the virtual field of view may be fixed relative to the virtual security camera placement location and the site in the virtual environment. The method may further include displaying the virtual field of view in concert with the real time video stream when the current field of view of the mobile virtual reality device encompasses the geographic region covered by the virtual field of view.

Alternatively or additionally to any of the embodiments above, the method may further include repeating the placing, providing and displaying steps for one or more other virtual security cameras.

Alternatively or additionally to any of the embodiments above, the mobile virtual reality device may include a smart phone, a tablet computer, a laptop computer or a virtual reality headset.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

Figure 1:
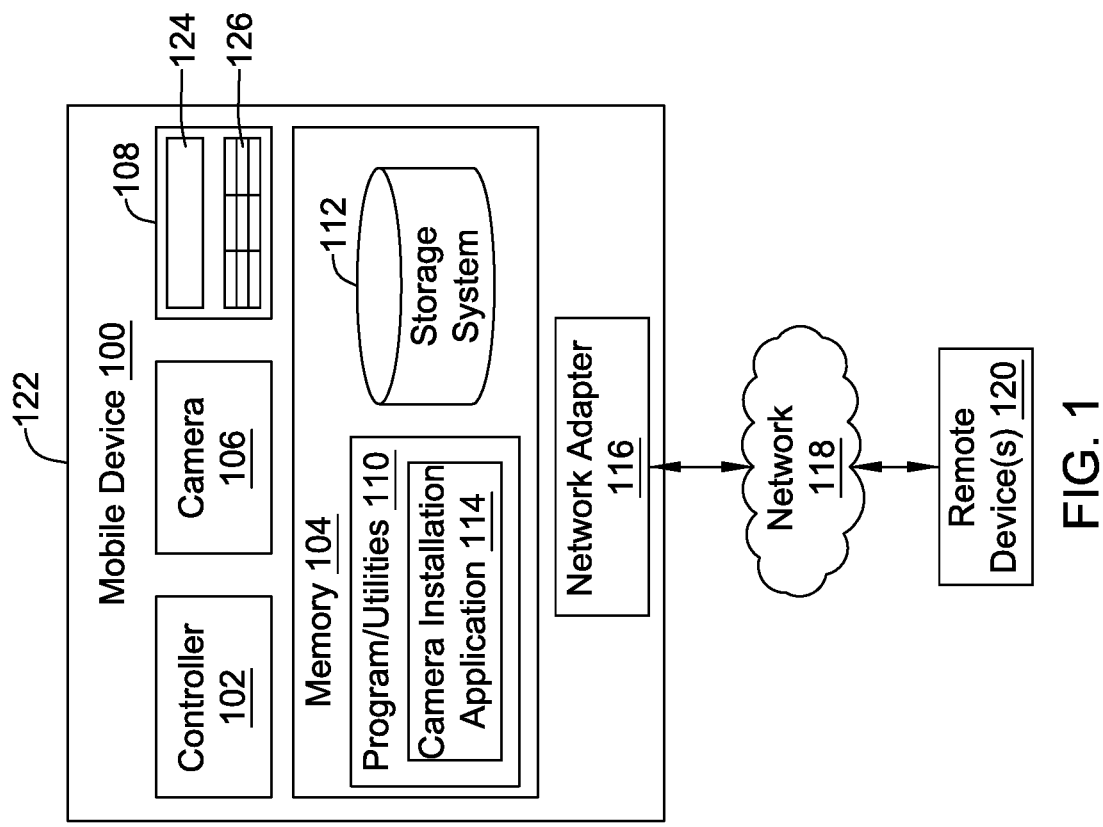
FIG. 1 is a schematic view of an illustrative mobile device to aid in camera installation planning of a security system of a site.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

The current disclosure relates to devices, controllers, systems, computer programs, and methods adapted for aiding, establishing, and planning camera placement for security monitoring and/or surveillance. In some cases, a mobile device may include a camera used to capture a video stream of a geographical area or site. In some instances, the mobile device may display a camera field of view of the geographical area captured by the camera of the mobile device. In some cases, the camera field of view may be displayed on a display of the mobile device in real time. In some examples, the mobile device may be configured to place virtual security cameras in the camera field of view and display a virtual field of view for each virtual security camera placed in the camera field view. As such, before actual security cameras are actually physically installed throughout the geographical area, a user of the mobile device may view and select different virtual security cameras and placement configurations to decide which security camera types and placement configurations would be appropriate for monitoring/surveilling the geographical area of the site.

FIG. 1 is a schematic view of an illustrative mobile device 100 to aid in camera installation planning of a security system of a site. In some cases, the mobile device 100 may include a housing 122, a controller 102, memory 104, a camera 106, a user interface 108 including a display, and a network adapter 116. In some cases, the mobile device 100 may include more or fewer components such as, for example, depth sensing sensors to improve measurement data. In some instances, the mobile device 100 may be a smart phone, a tablet computer, a laptop computer, or a virtual reality headset, or any other type of mobile device capable of visually capturing a geographic area of a site.

In some cases, the controller 102 may include a pre-programmed chip, such as a very-large-scale integration (VLSI) chip and/or an application specific integrated circuit (ASIC). In such examples the chip may be pre-programmed with control logic in order to control the operation of the mobile device 100. In some cases, the pre-programmed chip may implement a state machine that performs the desired functions. By using a pre-programmed chip, the controller 102 may use less power than other programmable circuits (e.g. general purpose programmable microprocessors) while still being able to maintain basic functionality. In other instances, the controller 102 may include a programmable microprocessor. Such a programmable microprocessor may allow a user to modify the control logic of the mobile device 100 even after it is installed in the field (e.g. firmware update), which may allow for greater flexibility of the mobile device 100 in the field over using a pre-programmed ASIC. In either case, the controller 102 may be programmed to direct the mobile device 100 to establish placements of security cameras for surveillance of a site.

In some cases, the camera 106 of the mobile device 100 may be operatively coupled to the controller 102. In some examples, the camera 106 may even be fixed relative to the housing 122 of the mobile device 100 such that as the orientation of the housing is changed by a user, the field of view of the camera 106 may change accordingly. In some cases, the camera 106 may include, for example, a complementary metal-oxide semiconductor (CMOS) image sensor or a charge-coupled device (CCD) image sensor designed to sense, display, and/or store images in real-time and on demand so that the mobile device 100 may effectively act as a camera device for capturing images of geographical areas of a site and providing a real time video stream of a current field of view of the camera 106 of the mobile device 100. In some instances, the captured images may be forwarded across a network, such as network 118, for example.

In the illustrative example shown in FIG. 1, the user interface 108 may be operatively coupled to the controller 102 and also may be fixed relative to the housing 122. In some cases, the user interface 108 may be configured to permit the mobile device 100 to display the camera field of view captured by the camera 106 of the mobile device. The user interface 108 may also be configured to accept user input. For example, the user interface 108 may be configured to accept virtual security camera selections and virtual placement locations for the selected cameras. When so provided, the user interface 108 may assist a user in deciding which security camera types to use and appropriate placement locations for monitoring/surveilling a desired geographical area of a site.

In some cases, the user interface 108 may include a display screen 124 and/or a distinct keypad 126. The display screen 124 may be any suitable display. In some instances, the display screen 124 may include or may be a liquid crystal display (LCD), an OLED, etc., and in some cases a fixed segment display, a dot matrix LCD display, a two 7-segment display, and one or more LEDs. In some cases, the user interface 108 may be a touch screen LCD panel that functions as both the display screen 124 and the keypad 126. In some instances, when the mobile device 100 includes a virtual reality device or headset, the user interface 108 may provide a virtual reality depiction of the geographical areas captured and streamed by the camera 106. In some cases, the user interface 108 may be a dynamic graphical user interface. In some cases, the user interface 108 may be provided separate from the mobile device 100 and may facilitate a user's interactions with the mobile device 100.

In some cases, the mobile device 100 may communicate with one or more remote device(s) via the network 120 using the network adapter 116. The network 118 may include a wired and/or a wireless network(s) that can be, for instance, a wide area network (WAN) such as the Internet, a local area network (LAN), a personal area network (PAN), a campus area network (CAN), or metropolitan area network (MAN), among other types of wireless networks. In some instances, the mobile device 100 may include a communication port (not explicitly shown). It is contemplated that the communication ports may be wired and/or wireless. When the communication ports are wireless, the communication port may include a wireless transceiver, and the remote device(s) 120 may include a compatible wireless transceiver. It is contemplated that the wireless transceivers may communicate using a standard and/or a proprietary communication protocol. Suitable standard wireless protocols may include, for example, cellular communication, Lon, BACnet, Modbus, ZigBee, Bluetooth, WiFi, IrDA, dedicated short range communication (DSRC), EnOcean, or any other suitable wireless protocols, as desired.

In some cases, the memory 104 may be operatively coupled to the controller 102 and may be used to store any desired information, such as captured images of geographical areas from the camera 106, virtual security camera selections, virtual security camera placement locations at a geographical area or site, a virtual model of the site, a Building Information Model (BIM) of a site, and/or any other suitable information. In some instances, the memory 104 may include a storage system 112 that may be any suitable type of storage including, but not limited to, RAM, ROM, EPROM, flash memory (e.g., NAND flash memory), an external SPI flash memory, a hard drive, and/or the like. In some cases, the storage system 112 may include two or more types of memory. For example, the storage system 112 may include a RAM, a ROM and a flash memory module. During operation, the controller 102 may store information within the storage system 112, and may subsequently retrieve the stored information from the storage system 112.

Program/utility 110 may be stored in the memory 104 and may include one or more application program modules (e.g. software), such as a camera installation application 114. In some examples, the camera installation application 114 may be integrated with 3-D mapping functionality and/or building information modeling (BIM) functionality. In some cases, the program/utility 110 may include additional program modules as well as an operating system, one or more other application program modules, and program data. According to various examples, the application program modules (e.g., the camera installation application 114) may include, for example, various camera models/types/configurations, specs/functionality for each camera model, measurement and scaling functions, and other analytics for establishing/estimating a virtual field of view for each camera model relative to the field of the view of the camera 106 of the mobile device 100. In some cases, the camera installation application 114 may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

In some cases, the camera installation application 114 may provide instructions to the controller 102 to use the camera 106, the user interface 108, and resources stored in the memory 104 to aid in camera installation planning of a security system of a site. For example, a user of the mobile device 100 may be a security installation technician or a customer of a security installation organization. In some cases, the user may move about a site with the mobile device 100 and point the camera 106 of the mobile device 100 at areas of the site such that the camera 106 can provide camera video streams of each area of the site pointed to by the camera 106. In some cases, the camera video streams may be displayed on the display screen 124 of the user interface 108 of the mobile device 100. As discussed, in some examples, the camera video streams may be provided on the display screen 124 in real time and when the mobile device 100 includes a virtual reality device, the displayed camera video streams may be displayed as a virtual environment of the areas.

In some instances, the controller 102 may place a virtual security camera at a virtual security camera placement location at the site. In some cases, the user may select the virtual security camera placement location for the virtual security camera using the user interface 108 of the mobile device 100, and the controller 102 may place the virtual security camera at the virtual security camera placement location based on the user selection. The controller 102 may also determine and provide a virtual field of view of the virtual security camera, sometimes based on the particular virtual camera selected. In some cases, the virtual field of view of the selected virtual camera may be geographically fixed relative to the virtual security camera placement location at the site. In some instances, a particular geographic area of the site may correspond to at least a part of the virtual field of view of the placed virtual security camera. Accordingly, when the camera 106 of the mobile device 100 is orientated by the user to provides a camera video stream on the display screen 124 that includes the geographic area, the part of the virtual field of view that corresponds to the geographic area may also be displayed along with the camera video stream. In some instances, the part of the virtual field of view may be superimposed over the camera video stream, or otherwise concurrently displayed. In cases where the camera video stream is a real time camera video stream, the virtual field of view may be displayed in concert with the real time camera video stream. In some examples, the controller 102 may store the virtual security camera placement location of the virtual security camera at the selected site in the memory 104.

As stated, when the camera video stream displays a particular geographic area, only the part of the virtual field of view of the virtual camera that corresponds to the geographical area may be displayed on the display of the mobile device 100. This may occur in situations where the camera field of view of the mobile device 100 only includes part of the geographic area covered by the virtual field of view of the virtual security camera. Moreover, in some cases, the user may move the mobile device 100 to view a different geographical area of the site that does not include the virtual field of view of the virtual security camera. Accordingly, the camera video stream of the new geographical area may be displayed but the virtual field of view of the virtual security camera may not be included on this display.

In some examples, the user may provide input via the user interface 108 to change the virtual field of view of the virtual security camera. For instance, the user may increase or decrease the desired virtual field of view of the virtual security camera. In some cases, when the virtual field of view is changed, the controller 102 may change the current virtual security camera to another virtual security camera that has or is capable of providing the desired virtual field of view. In some instances, the controller 102 may also display on the display screen 124 a plurality of available virtual security cameras, and the user may provide input via the user interface 108 to select a virtual security camera from the plurality of available virtual security cameras. As such, when the user selects different virtual security cameras, the controller 102 may determine and provide the corresponding virtual field of view of the selected virtual security camera.

Figure 2A:
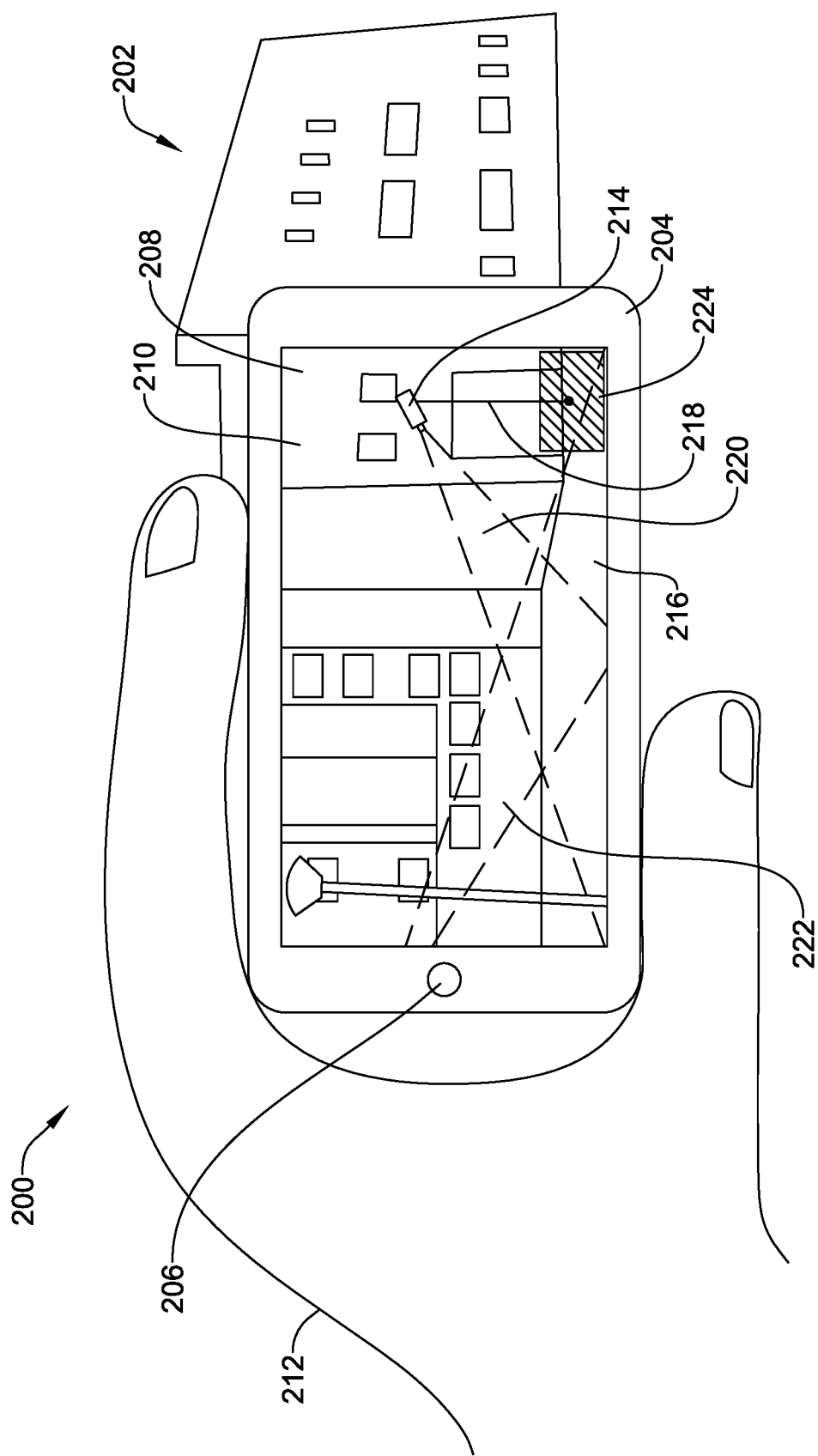
FIGS. 2A-2B show an illustrative method for establishing placement of a security camera for surveillance of a site.
Figure 2B:
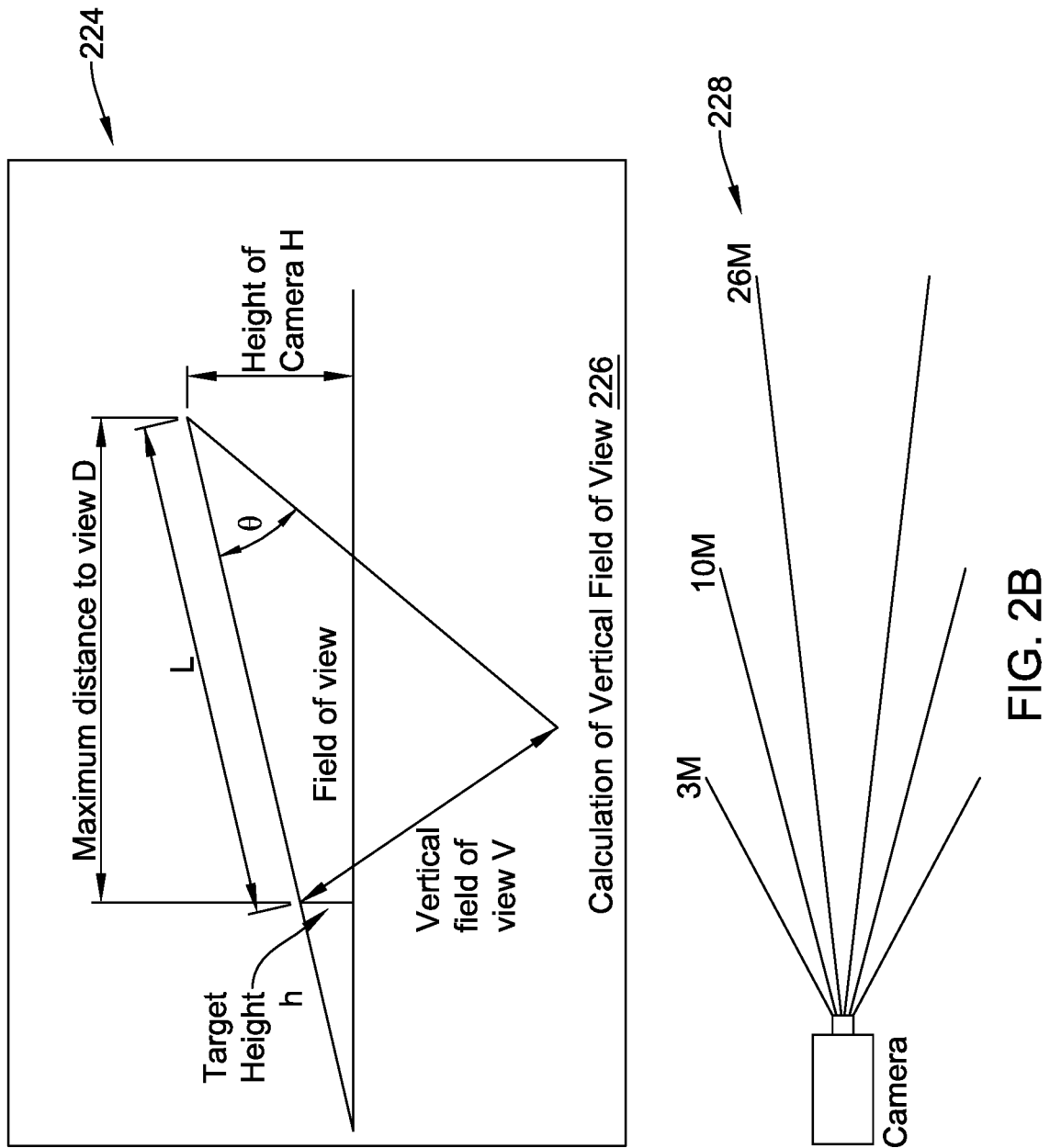

FIGS. 2A-2B are illustrative views of a method 200 for establishing placement of a security camera for surveillance of a site 202. As shown in FIG. 2A, a user 212 may use a camera 206 of a mobile device 204 to capture a real-time camera video stream 210 of a part of the site 202. As can be seen, in this example, the mobile device 204 may be a smart phone or tablet, and the site 202 may be an outdoor site such as, for example, outside of a business building, a school building, a library, a restaurant, a house, or a recreation center or any other site. In some cases, the part and/or size of the site 202 captured by the camera 206 of the mobile device 204 may be based on a camera field of view 216 of the camera 206 of the mobile device 204. In some examples, the captured camera video stream 210 that contains the part of site 202 may be displayed on a display 208 of the mobile device 204. As such, the user may view the camera video stream 210 of the part of the site 202 and move the mobile device 204 to change which part of the site 202 is in the camera field of view 216 and captured on the camera video stream 210 and displayed on the display 208.

In some cases, included on the camera video stream 210 may be placement locations for virtual security cameras. That is, the camera field of view 216 may be positioned to encompass a desired location of the site 202 for placement of a virtual security camera. In some instances, the mobile device 204 may display an icon 214 that may indicate a virtual security camera placement location of a virtual security camera at the site 202. In this examples, the icon 214 is configured to resemble a virtual security camera. In other examples, however, the icon 214 may have any suitable shape or form such as, for instance, a circle/dot or another general shape. Hereinafter, the icon 214 will be referred to as the virtual security camera 214. In some cases, the user of the mobile device 204 may place the icon 214 at any desired location in the field of view 216 of the camera 206. In some cases, the mobile device 204 may automatically place the virtual security camera 214, and the user may review and/or reposition the virtual security camera 214 as desired. In the example shown, the user has placed the virtual security camera 214 on a pole 218. However, other locations encompassed by the camera field of view 216 may be suitable placement locations for the virtual security camera 214 or other virtual security cameras. In some cases, the mobile device 204 may receive an input such as, for example, a press on the display 208 (if the display 208 is a touchscreen) or another part of the user interface, from the user 212 that places the virtual security camera 214 at a desired location. The virtual security camera 214 may then be fixed at this geo-location of the site 202, such that if the field of view of the camera of the mobile device 204 no longer includes that geo-location, the icon representing the virtual security camera 214 is no longer shown in the field of view of the camera of the mobile device 204. In the example shown, the mobile device 204 may display at least part of the virtual field of view 220 of the virtual security camera on the camera video stream 210 of the mobile device 204 when the camera field of view 216 encompasses at least part of the virtual field of view 220 of the virtual security camera.

In some instances, the virtual field of view 220 of the virtual security camera may be superimposed over the camera video stream 210 and in real time. In some cases, a reference measurement may be used to scale the virtual field of view 220 relative to the camera video stream 210. For instance, the user 212 may input a height of the light pole 218 and the mobile device 204 may use the height of the light pole 218 as a reference measurement so that a geographic region covered by the virtual field of view 220 of the virtual security camera will be scaled properly with the field of view of the camera of the mobile device 204. In another example, the mobile device 204 may have the capability to obtain a reference measurement on its own. For example, the mobile device 204 may include a depth sensor that can be used to measure sizes of objects in the camera field of view 216. The measurement(s) may be used as a reference measurement so that the geographic region covered by the virtual field of view 220 in the real time camera video stream will be to scaled to correspond to the corresponding geographic region in the real time camera video stream.

In some instances, the mobile device 204 may provide a details box 224 on the display 208 that includes some or all of the scaled measurements of the virtual field of view 220. FIG. 2B depicts an example of a details box 224. As shown, the details box 224 may include a calculation of a vertical field of view 226. Moreover, the details box 224 may include a measured or calculated height of the virtual security camera 214 (H), a maximum distance to view (D), a target height (h) (e.g., the minimum height the virtual field of view 220 must reach at D), a length (L) between the H and the h, a vertical field of view (V), and a span of the virtual field of view 220 (θ3). In some cases, the details box 224 may also include camera specifications 228 of the selected virtual camera. In some examples, the camera specifications 228 may include the maximum distance to view (D) for different camera models/types. For instance, as shown, the maximum distance to view (D) for a 2.8 mm security camera may be 3 meters, the maximum distance to view (D) for a 6 mm security camera may be 10 meters, and the maximum distance to view (D) for a 16 mm security camera may be 25 meters. This is just one example of the types of camera specifications 228 that may be included in the details box 224. Moreover, the depicted details box 224 is just one example of a details box that may be provided by the mobile device 204 to aid the user in making a selection and/or placement location for a virtual camera. Other details boxes may be used as desired.

Turning back to FIG. 2A, in some cases, input may be provided to the mobile device 204 to change the virtual field of view 220. For example, the user 212 may drag a finger across the display 208 to increase or decrease the maximum distance to view (D) of the virtual field of view 220, the h of the virtual field of view 220, the L of the virtual field of view 220, the V of the virtual field of view 220, and/or the θ3 of the virtual field of view 220. In some cases, when the virtual field of view 220 is changed, the mobile device 204 may change the virtual security camera 214 to another virtual security camera that has or is capable of the selected virtual field of view 220. In some cases, when the virtual field of view 220 is stretched too far, the mobile device 204 may indicate to the user that the virtual security camera 214 needs a telescope lens to have the selected virtual field of view 220. In some instances, the mobile device 204 may display a plurality of available virtual security cameras and the user 212 may select the virtual security camera 214 from the plurality of available virtual security cameras. If or when the virtual security camera 214 is changed to another virtual security camera, the mobile device 204 may update/adjust the virtual field of view for the selected virtual security camera. That is, the virtual field of view may be scaled to correspond to the specifications of the newly selected virtual security camera.

As can be seen, in the example shown, the camera field of view 216 encompasses both the placement location (i.e., the light pole 218) of the virtual security camera 214 and a majority of the virtual field of view 220. In some instances, the virtual field of view 220 may be geographically fixed relative to the geo-location of the virtual security camera 214 (i.e., the placement location of the virtual security camera 214 at the site, in this case, the light pole 218) and therefore, the site 202. As such, if the user 212 were to move the mobile device 204 to change the camera field of view 216 such that the light pole 218 and the virtual security camera 214 are no longer included in the camera field of view 216, the mobile device 204 may still display part of the virtual field of view 220 that remains encompassed by the camera field of view 216.

For example, virtual field of view 222 depicts a part of a virtual field of view of a virtual security camera (not shown) that is not included in the camera field of view 216. Accordingly, the virtual security camera is not displayed on the display of the mobile device 204. However, part of the virtual field of view 222 of that virtual security camera (not shown) is still encompassed by the camera field of view 216 and may therefore be displayed on the display of the mobile device 204. In some cases, if the user 212 were to move the mobile device 204 enough such that no part of the virtual field of view 220 or the light pole 218 are included in the camera field of view 216, and no part of the virtual field of view 222 are included in the camera field of view 216, the mobile device 204 may display the camera video stream 210, but not display the virtual field of 220, the virtual security camera 214, the virtual field of view 222 or its corresponding virtual security camera.

The method 200 may be repeated for placing, providing, and displaying additional virtual security cameras around the site 202. In some cases, the mobile device 204 may provide suggestions to the user 212 for placement of virtual security cameras. For instance, the mobile device 204 may suggest a number of security cameras and security camera placement locations throughout the site 202 so that all or almost all of the site 202 will be monitored with minimum or no blind spots. In some examples, the mobile device 204 may suggest camera models that maximize the monitoring of the site 202. The mobile device 204 may also indicate lengths of cables that would be needed for the security cameras at the current or suggested placement locations, nearby power sources that may be used at the site 202, and/or determine the number of switches needed for the current configured surveillance system. In some cases, the camera field of view 216 provided by the mobile device 204 may be a virtual reality view. For example, if the mobile device 204 includes a 3D map application or a BIM of the site, the mobile device 204 may display on the display 208, a virtual reality view of the site 202 as the user traverses the site. Moreover, mobile device 204 may have a day and night mode so that the virtual camera placement locations and virtual fields of view may be viewed under both day and night conditions.

In some cases, the mobile device 204 may store the virtual security camera placement location(s) and any or all information related to the virtual security camera placement configuration. Then, before actual security cameras are placed throughout the site 202, a customer may walk around the site and view the virtual security cameras, virtual fields of view, and placement configurations to decide if acceptable before real security cameras are installed at the site 202.

Figure 3:
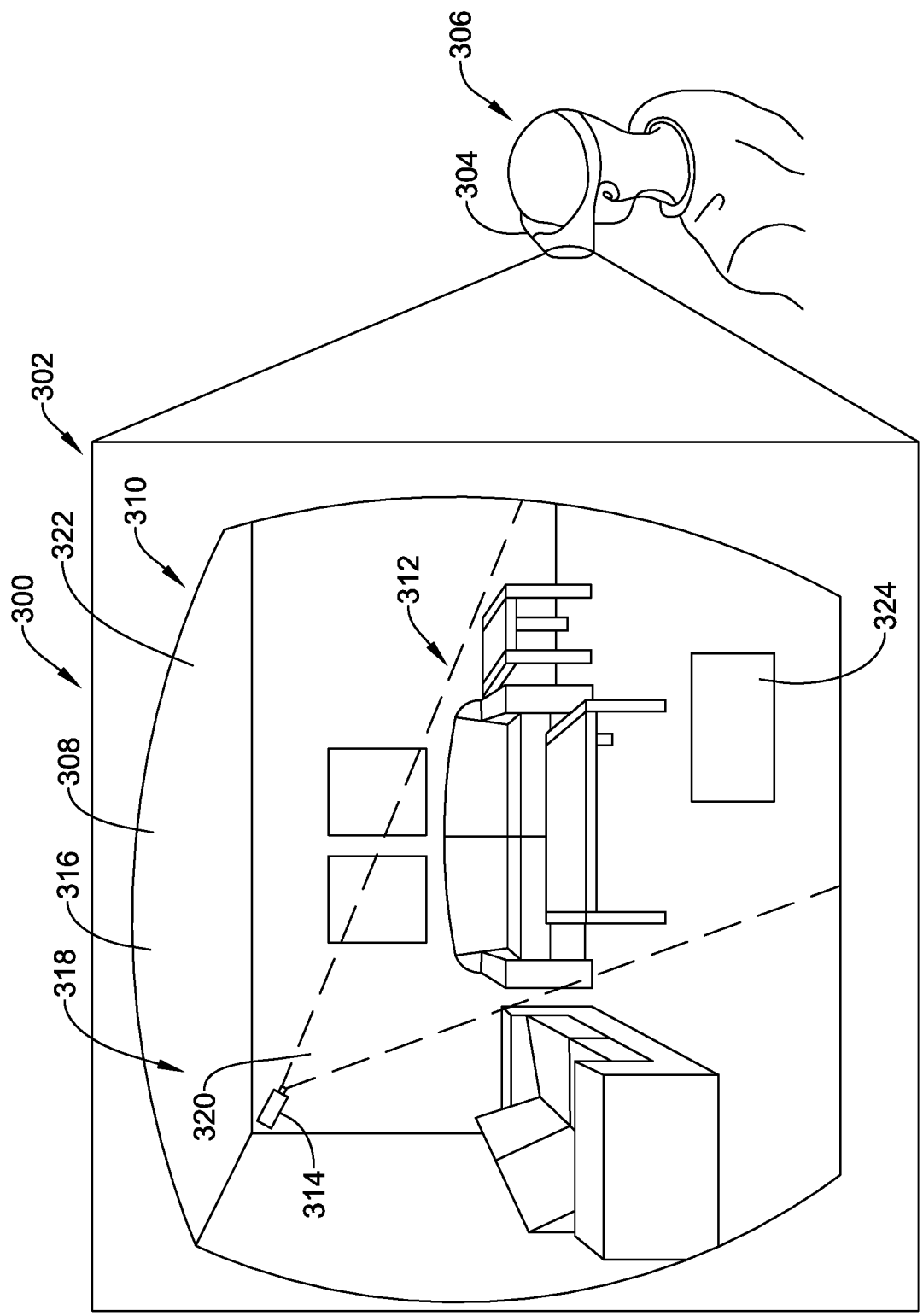
FIG. 3 shows an illustrative method for planning placement of security cameras for surveilling of site.

FIG. 3 is an illustrative view of a method 300 for planning placement of one or more security cameras in a room 302 of a building. As shown in FIG. 3, a user 306 may use a camera of a mobile device (i.e., a mobile virtual reality device 304) to capture a real time video stream 310 of a current field of view 316 of a mobile virtual reality device 304. As can readily be seen, in this example, the mobile virtual reality device 304 may include a virtual reality headset. However, in other examples, the mobile virtual reality device 304 may be, for example, a smart phone, a tablet computer, or a laptop computer. In some case, the current field of view 316 may be a virtual environment 322 of the room 302. Similar to method 200, the user 306 may move the mobile virtual reality device 304 about the room 302.

In some cases, included on the current camera field of view 316 may be placement locations for virtual security cameras. In the example shown, the mobile virtual reality device 304 displays a virtual security camera 314 at a virtual security camera placement location in the room 302. As shown, the virtual security camera placement location corresponds to a room corner 318. This may geographically fix the virtual security camera 314 relative to the room 302 in the virtual environment 322. In some cases, the mobile virtual reality device 304 may receive an input from the user 306 that places and fixes the virtual security camera 314 at the room corner 318.

As can be seen, the mobile virtual reality device 304 displays a virtual field of view 320 in the current field of view 316 of the mobile virtual reality device 304. As shown, the virtual field of view 320 may cover a geographic region 312 of the room 302 and the virtual field of view 320 may be fixed in the virtual environment 322. Accordingly, when the current field of view 316 of the mobile virtual reality device 304 encompasses the geographic region 312, the mobile virtual reality device 304 may display the virtual field of view 320 in concert (e.g. overlaid over) with the real time video stream 310 of the current view field of view 316 of the mobile virtual reality device 304. In some cases, a reference measurement may be used to scale the virtual field of view 320 relative to the real time video stream 310 of the mobile virtual reality device 304, as described above. Moreover, in some instances, the mobile virtual reality device 304 may provide a details box 324 similar to the details box 224 depicted in FIG. 2B. However, other detail box configurations may be displayed on display 308. Additionally, the virtual field of view 320 may be increased and decreased and a plurality of virtual security cameras may be displayed and selected similar to the method 200.

As can be seen, in the example shown in FIG. 3, the current field of view 316 of the mobile virtual reality device 304 encompasses both the placement location (i.e., the room corner 318) of the virtual security camera 314 and a majority of the virtual field of view 320. As stated, the virtual field of view 320 may be geo-fixed in the virtual environment. As such, in some cases, if the user 306 were to move the mobile virtual reality device 304 to change the current field of view 316 of the mobile virtual reality device 304 such that the room corner 318 and the virtual security camera 314 are no longer included in the current field of view 316 of the mobile virtual reality device 304, the mobile virtual reality device 304 may still display part of the geographic region 312 that remains encompassed by the current field of view 316 of the mobile virtual reality device 304. In some cases, if the user 306 were to move enough such that no part of the geographic region 312 is included in the current field of view 316 of the mobile virtual reality device 304, the mobile virtual reality device 304 may display the real time video stream 310, but not display the geographic region 312.

The method 300 may be repeated for placing, providing, and displaying multiple virtual security cameras. Moreover, similar to the mobile device 204, the mobile virtual reality device 304 may provide suggestions, indicate security camera types, sizes, and/or may have a day and night modes of operation as described above. In some cases, the mobile virtual reality device 304 may also store the virtual security camera placement locations and any or all information related to the virtual security camera placement configuration at the room 302, allowing a customer to view and select different virtual security cameras and placement configurations before real security cameras are placed at the room 302.

The examples described are by no means exhaustive and are for illustrative purposes. In some cases, variations may be made to the examples such as, the site locations for camera installation, the selection of virtual cameras being placed, scaling methods, determining suitable virtual camera placement locations at a particular site, etc. Accordingly, the examples described are not to be seen as limiting in scope.

Figure 4:
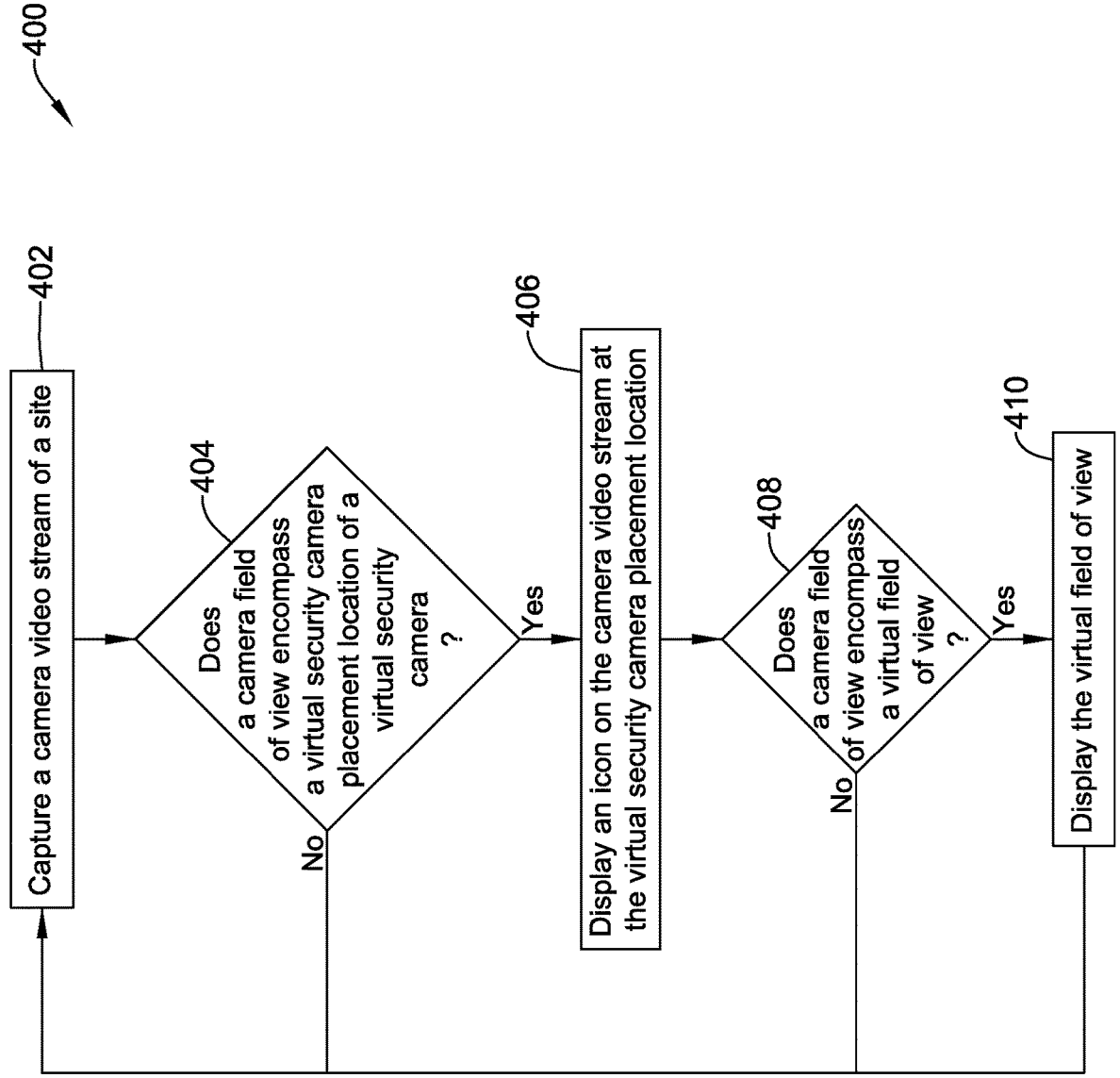
FIG. 4 is a flow chart showing an illustrative method for establishing placement of a security camera for surveillance of a site.

FIG. 4 is a flow chart showing an illustrative method 400 for establishing placement of a security camera for surveillance of the site. The method 400 begins at step 402, where a camera video stream of a site is captured. In some examples, the camera video stream may be captured by a mobile device having a camera that has a camera field of view. At step 404, it is determined if the camera field of view encompasses a virtual security camera placement location of a virtual security camera. If the virtual security camera placement location is not encompassed by the camera field of view, at step 404, control is returned back to step 402. If the virtual security camera placement location is encompassed by the camera field of view, control is passed to step 406, and an icon is displayed on the camera video stream at the virtual security camera placement location. In some examples, the icon may indicate the virtual security camera placement location of the virtual security camera at the site. At step 408, it is determined if the camera field of view encompasses a virtual field of view of the virtual security camera. If the virtual field of view is not encompassed by the camera field of view, control is passed back to step 402. If the virtual field of view is encompassed by the camera field of view, control is passed to step 410, and the virtual field of view may be displayed. In some examples, the virtual field of view may be geographically fixed relative to the virtual security camera placement location and the site. Moreover, the method 400 continues at step 402, where the camera video stream of the site continues to be captured.

Figure 5:
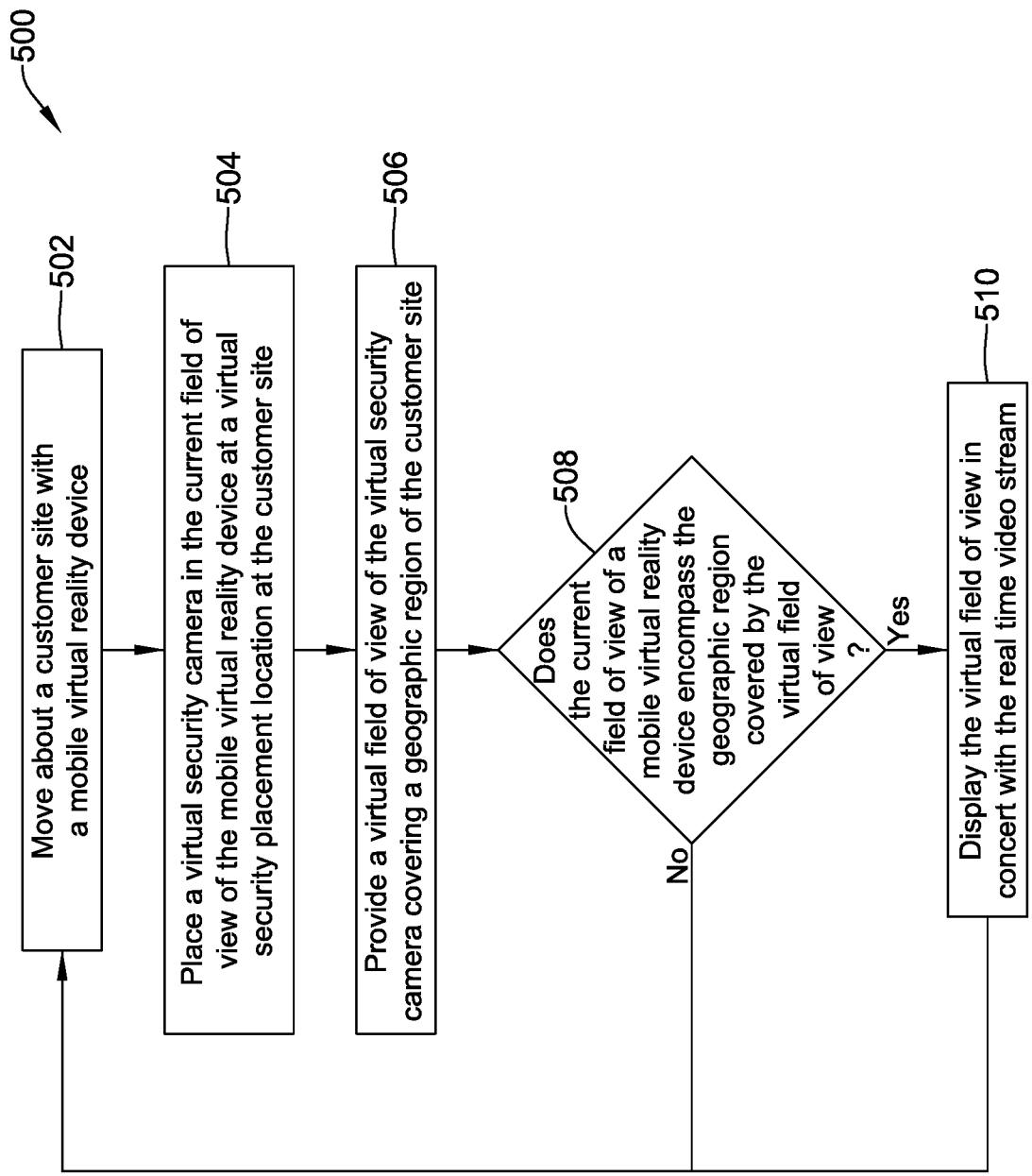
FIG. 5 is a flow chart showing an illustrative method for planning placement of security cameras for surveilling of a site.

FIG. 5 is a flow chart showing an illustrative method 500 for planning placement of one or more security camera for surveilling a site. The method 500 begins at step 502, where a mobile virtual reality device is moved about a site. In some examples, the mobile virtual reality device may include a camera that provides a real time video stream of a current field of view of the mobile virtual reality device. In some examples, the current field of view is referenced to a virtual environment of the site. At step 504, a virtual security camera is placed in the current field of view of the mobile virtual reality device at a virtual security placement location at the site. In some examples, the virtual security camera placement location may become geographically fixed relative to the site in the virtual environment. At step 506, a virtual field of view of the virtual security camera is provided covering a geographic region of the site. In some examples, the virtual field of view may be fixed relative to the virtual security camera placement location and the site in the virtual environment. At step 508, it is determined if the current field of view of the mobile virtual reality device encompasses the geographic region covered by the virtual field of view. If the current field of view of the mobile virtual reality device does not encompass the geographic region covered by the virtual field of view, control is passed back to step 502. If the current field of view of the mobile virtual reality device does encompass the geographic region covered by the virtual field of view, control is passed to step 510, and the virtual field of view is displayed in concert with the real time video stream. The method 500 continues at step 502, where the mobile virtual reality device is moved about a site.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mobile device configured to aid in camera installation planning of a security system of a site, the mobile device comprising:
 a housing;
 a user interface, wherein the user interface includes a display screen fixed relative to the housing;
 a camera fixed relative to the housing such that the housing is oriented by a user to point a camera field of view of the camera at various areas of the site, wherein the camera provides a camera video stream of the camera field of view for display on the display screen of the mobile device, the camera field of view covering a corresponding portion of the site visible to the camera when the camera of the mobile device is aimed at the site;
 a controller carried by the housing and operatively coupled to the display screen and the camera, the controller configured to display, over a currently displayed camera video stream, a visible representation of at least part of a virtual field of view of a virtual security camera that is virtually placed at a virtual security camera placement location at the site when the camera field of view of the currently displayed camera video stream currently captured by the camera and displayed on the display screen encompasses a geographic area of the site that corresponds to at least part of the visible representation of the virtual field of view of the virtual security camera, wherein the visible representation of the virtual field of view of the virtual security camera is geographically fixed relative to the virtual security camera placement location and the site, and the visible representation of the virtual field of view of the virtual security camera corresponds to a portion of the site that would be visible to an actual security camera when placed at the virtual security camera placement location in order to provide an indication to the user of what portion of the site would be visible to the actual security camera when placed at the virtual security camera placement location.

2. The mobile device of claim 1, wherein the controller is configured to not display the visible representation of the virtual field of view of the virtual security camera when the camera field of view of the camera video stream currently displayed on the display screen displays a geographic area of the site that does not encompass any part of the visible representation of the virtual field of view of the virtual security camera.

3. The mobile device of claim 1, wherein the controller is configured to store the virtual security camera placement location of the virtual security camera at the site.

4. The mobile device of claim 1, wherein the visible representation of the virtual field of view of the virtual security camera is, when displayed, superimposed over the camera video stream.

5. The mobile device of claim 1, wherein the camera video stream is displayed on the display screen in real time.

6. The mobile device of claim 1, wherein the controller is further configured to receive from the user of the mobile device via the user interface an input that places the virtual security camera at the virtual security camera placement location at the site while the camera video stream displays the virtual security camera placement location.

7. The mobile device of claim 1, wherein the controller is further configured to receive from the user of the mobile device via the user interface an input that changes the visible representation of the virtual field of view of the virtual security camera relative to the site.

8. The mobile device of claim 1, wherein the controller is further configured to receive from the user of the mobile device via the user interface an input that selects the virtual security camera from a plurality of available virtual security cameras.

9. The mobile device of claim 1, wherein the controller is further configured to use a reference measurement to scale the visible representation of the virtual field of view relative to the camera video stream.

10. The mobile device of claim 1, wherein the mobile device includes a smart phone, a tablet computer, a laptop computer or a virtual reality headset.

11. A method for establishing placement of a security camera for surveillance of a site, the method comprising:
 capturing a camera video stream of at least part of the site using a camera of a mobile device, the camera of the mobile device having a camera field of view that corresponds to a portion of the site visible to the camera when the camera is aimed at the site;

displaying the camera video stream on a display of the mobile device in real time;

displaying an icon on the displayed camera video stream when the camera field of view encompasses a virtual security camera placement location of a virtual security camera, wherein the icon indicates the virtual security camera placement location of the virtual security camera at the site; and displaying a visible representation of a virtual field of view of the virtual security camera superimposed on the displayed camera video stream when the camera field of view of the camera of the mobile device is moved to encompass at least part of the site that corresponds to at least part of the visible representation of the virtual field of view of the virtual security camera, wherein the visible representation of the virtual field of view is geographically fixed relative to the virtual security camera placement location and the site, and the visible representation of the virtual field of view of the virtual security camera corresponds to a portion of the site that would be visible to an actual security camera if placed at the virtual security camera placement location in order to provide an indication to the user of what portion of the site would be visible to the actual security camera when placed at the virtual security camera placement location.

12. The method of claim 11, further comprising:

moving the camera such that the camera field of view does not include the virtual security camera placement location and does not include any part of the visible representation of the virtual field of view of the virtual security camera, and in response, displaying the camera video stream but not displaying the icon or the visible representation of the virtual field of view of the virtual security camera.

13. The method of claim 11, further comprising receiving an input that places the icon at the virtual security camera placement location while the camera field of view encompasses the virtual security camera placement location.

14. The method of claim 11, further comprising receiving an input that adjusts the visible representation of the virtual field of view of the virtual security camera.

15. The method of claim 11, further comprising receiving an input that selects the virtual security camera from a plurality of available virtual security cameras, each of the plurality of available virtual security cameras having a different virtual field of view characteristic.

16. The method of claim 11, further comprising using a reference measurement to scale the visible representation of the virtual field of view relative to the camera video stream.

17. The method of claim 11, wherein the mobile device includes a smart phone, a tablet computer, a laptop computer or a virtual reality headset.

18. A method for planning placement of one or more security cameras for surveilling a site, the method comprising moving about the site with a mobile virtual reality device that includes a camera that provides a real time video stream of a current camera field of view of the mobile virtual reality device, wherein the current camera field of view is referenced to a virtual environment of the site;

placing a virtual security camera in the current camera field of view of the mobile virtual reality device at a virtual security camera placement location at the site, wherein the virtual security camera placement location becomes geographically fixed relative in the site in the virtual environment;

determining a visible representation of a virtual field of view of the virtual security camera, the visible representation of the virtual field of view of the virtual security camera covering a geographic region of the site, wherein the visible representation of the virtual field of view is fixed relative to the virtual security camera placement location and the site in the virtual environment and provides an indication to the user of what portion of the site would be visible to an actual the virtual security camera if when placed at the virtual security camera placement location; and displaying at least part of the visible representation of the virtual field of view of the virtual security camera in concert with the real time video stream captured by the camera of the of the mobile virtual reality device when the current camera field of view of the camera of the mobile virtual reality device encompasses at least part of the geographic region covered by the visible representation of the virtual field of view of the virtual security camera.

19. The method of claim 18, further includes:

repeating the placing, providing and displaying steps for one or more other virtual security cameras at the site.

20. The method of claim 18, wherein the mobile virtual reality device includes a smart phone, a tablet computer, a laptop computer or a virtual reality headset.

* * * * *